United States Patent [19]

Gray

[11] 3,710,265

[45] Jan. 9, 1973

[54] QUADRATURE-TO-SERIAL PULSE CONVERTER

[75] Inventor: Alden J. Gray, Wallingford, Vt.

[73] Assignee: Howe Richardson Scale Company, Clifton, N.J.

[22] Filed: April 1, 1971

[21] Appl. No.: 130,290

[52] U.S. Cl. ....................328/61, 328/110, 328/166, 324/165, 340/271

[51] Int. Cl. ....................H03k 1/12

[58] Field of Search ........328/61, 166, 110; 324/165; 340/271; 307/273

[56] References Cited

UNITED STATES PATENTS

| | | | |
|---|---|---|---|
| 3,018,390 | 1/1962 | Yourke et al. | 307/273 |
| 3,299,702 | 1/1967 | Hulme | 324/165 X |
| 3,327,226 | 6/1967 | Nourney | 328/110 X |
| 3,593,161 | 7/1971 | Ritz | 328/110 X |
| 3,614,616 | 10/1971 | Bucek et al. | 340/271 X |

*Primary Examiner*—John S. Heyman
*Attorney*—Strauch, Nolan, Neale, Nies & Kurz

[57] ABSTRACT

A converter for converting a quadrature pulse train into first and second serial pulse trains which respectively correspond to opposite directions of travel of a generator supplying said quadrature pulse train. The converter comprises a first circuit responsive to said quadrature pulse train for producing a third serial pulse train in which the number of pulses correspond to the total number of pulse edges in said quadrature pulse train, and a second circuit means responsive to said third pulse train and said quadrature pulse train for forming the pulses of said first and second pulse trains. The second circuit includes a network for supplying the formed pulses to one output terminal when said generator is traveling in one direction to make up said first pulse train and for supplying the formed pulses to another output terminal when the generator is traveling in the opposite direction to make up said second pulse train.

12 Claims, 7 Drawing Figures

ANDED CONDITION:
AB

FOR C.W. READ SEQUENCE FROM TOP TO BOTTOM

ANDED CONDITION:
$\bar{A}B$

FOR C.C.W. READ SEQUENCE FROM BOTTOM TO TOP

ANDED CONDITION:
$\bar{A}\bar{B}$

ANDED CONDITION:
$A\bar{B}$

INVENTOR
ALDEN J. GRAY

BY Strauch, Nolan, Neale, Nies & Kurz
ATTORNEYS

INVENTOR
ALDEN J. GRAY

BY Strauch, Nolan, Neale, Nies & Kurz
ATTORNEYS

QUADRATURE-TO-SERIAL PULSE CONVERTER

FIELD OF INVENTION

This invention relates to converters and more particularly to quadrature-to-serial pulse converters.

SUMMARY AND OBJECTS OF INVENTION

A major object of this invention is to provide a novel quadrature-to-serial pulse converter that is relatively inexpensive, reliable, accurate and of relatively small size.

The converter of this invention converts a quadrature pulse train into one of two serial pulse trains depending upon the direction of travel of the quadrature pulse generator. According to a preferred embodiment of this invention, the conversion is accomplished by producing the four possible AND'ed combinations of the quadrature pulse train for each change in the logic level of each of the serial pulse trains making up the quadrature pulse train, by successively storing the four AND'ed conditions for each of the logic state changes in each serial train making up the quadrature pulse train, by effectively comparing each stored set of conditions with the next succeeding set of conditions at a bank of gates to determine the direction of travel of the quadrature pulse generator and to form the leading edge of either a count-up or count-down output pulse depending upon the detected direction of travel of the quadrature pulse generator, and by supplying a serial train of memory-commanding latching or storage pulses to transfer the current AND'ed condition information that was compared with the preceding information into storage in place of the preceding information to complete either the count-up or count-down pulse before next succeeding AND'ed condition information is applied to the previously mentioned bank of gates for the next comparison.

In further accordance with this invention the train of latching pulses is supplied by a time delay network comprising an exclusive OR gate having its input terminals connected to respectively receive the serial pulse trains making up the quadrature pulse train, a pair of one-shot multivibrators for respectively receiving the pulse train supplied by the OR gate and an inversion of the pulse train supplied by the OR gate, and a gating means for receiving the delay pulses supplied by the multivibrators and for supplying one serial train of the multivibrator pulses in which there are as many pulses or the total number of leading and trailing edges in the two serial trains making up the quadrature pulse train. Unlike conventional multivibrators, the multivibrators of this invention provide a critical delay in the rise time of the delay output pulse.

In the following description a logic or a logical 1 or a "high" designates a positive d.c. signal voltage such as +5v. A logic or logical 0 or a "low" designates a substantially zero d.c. signal voltage. The disclosure herein assumes positive logic purely for the purpose of description. Also, reference to a condition as being "AND'ed" designates the condition that an AND gate would supply at its output in response to at least two signal states at its input side.

Further objects of this invention will appear as the description proceeds in connection with the appended claims and below-described drawings.

DETAILED DESCRIPTION

Figure 1:
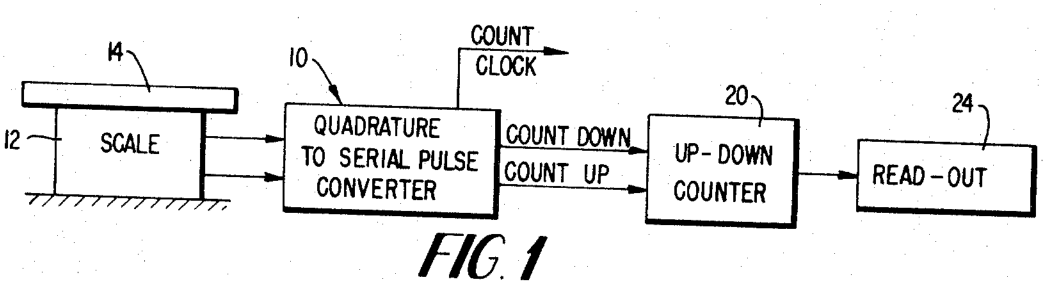
FIG. 1 schematically illustrates one application of the converter of this invention.

Referring to FIG. 1, the converter incorporating the principles of this invention is generally indicated at 10 and converts a quadrature pulse train into a serial pulse train at one of two output terminals depending on the direction of travel of the quadrature pulse train generator. In this embodiment the quadrature pulse train source is shown to be a weighing scale 12 although it will be appreciated that this invention is applicable for converting quadrature pulse trains from any source.

Figure 3:
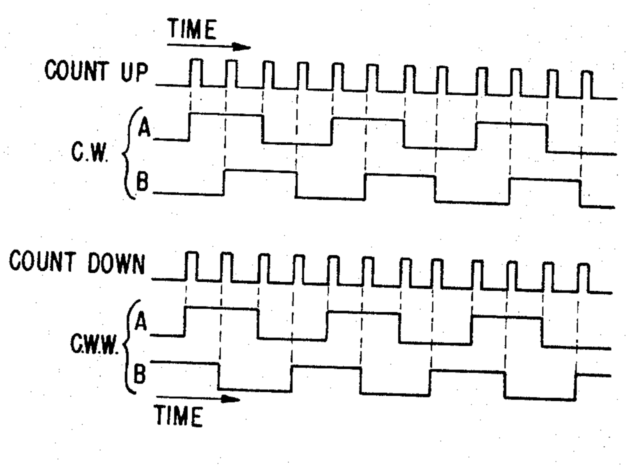
FIG. 3 is a pulse sequence diagram of the quadrature pulse train and the resulting serial pulse trains.

Scale 12 is of the type that has a platform or other load-receiving structure 14 that is displaceable in opposite directions from a null balance position. The quadrature pulse generator, which is incorporated into scale 12, produces the typical parallel pulse trains A and B (FIG. 3) when platform 14 is displaced. FIG. 3 shows the relationship of pulse trains A and B for both directions of travel, as well as the corresponding serial output pulse trains for both directions of travel.

The serial pulse count-up and count-down outputs of converter 10 may be applied to an up-down counter 20, and the output of counter 20 may be applied to a suitable read-out device 24 such as a display or a printer.

Figure 2:
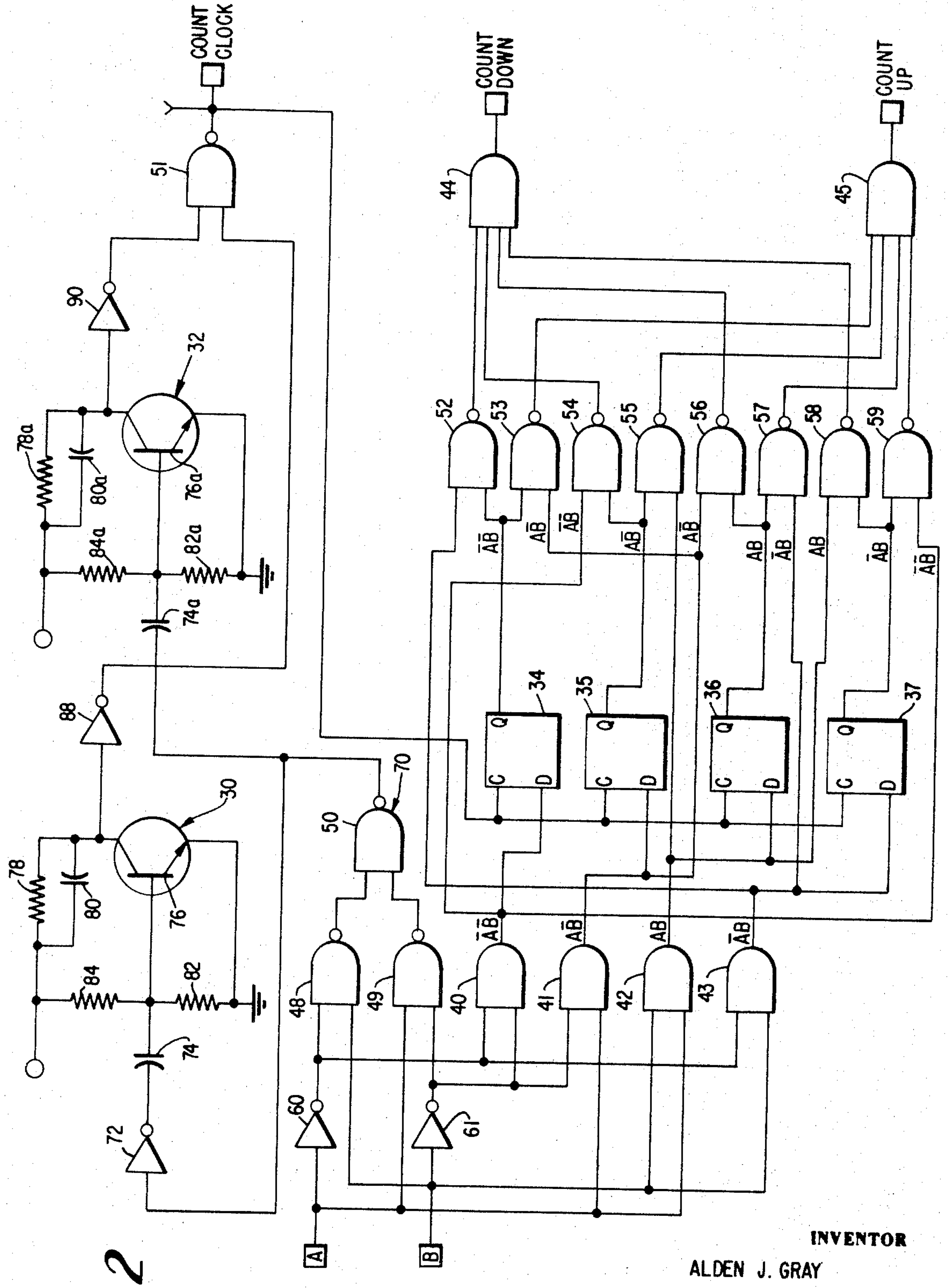
FIG. 2 is a circuit diagram of a quadrature-to-serial pulse converter incorporating the principles of this invention.

As shown in FIG. 2, serial trains A and B making up the quadrature pulse train are respectively applied to input terminals A and B of converter 10. Converter 10 comprises a pair of delay one-shot or monostable multivibrators 30 and 32, a series of quad latches 34, 35, 36 and 37, a series of AND gates 40, 41, 42, 43, 44 and 45, an inverted OR gate 48, a series of NAND gates 49, 50, 51, 52, 53, 54, 55, 56, 57, 58 and 59, and inverters 60 and 61.

Input pins A and B are respectively connected to inputs of inverters 60 and 61. The inputs of gate 48 are respectively connected to the output of inverter 60 and to pin B. The inputs of gate 49 are respectively connected to the output of inverter 61 to input pin A. The inputs of gate 50 are respectively connected to the outputs of gates 48 and 49.

From the foregoing it will be appreciated that gates 49–50 and inverters 60 and 61 are connected to provide an exclusive OR gate which is generally indicated at 70 and which has its inputs respectively connected to pins A and B. Since gate 70 changes its state whenever either input changes state, the frequency of the pulse train supplied at the output of gate 51 will be twice the frequency of one of the two quadrature pulse input trains.

The output of gate 50 is applied as a pulse triggering signal to the input of multivibrator 32 and also through an inverter 72 to the input of multivibrator 30.

The output of inverter 72 is coupled by a capacitor 72 to the base of a transistor 76 in multivibrator 30. A +5v d.c. signal voltage is connected to the collector of transistor 76 by parallel branches which respectively contain a resistor 78 and a capacitor 80. The emitter of transistor 76 is tied to ground, and the junction between capacitor 74 and the base of transistor 76 is connected respectively through resistors 82 and 84 to ground and the 5 volt power supply.

The circuit of multivibrator 32 is the same as that just described for multivibrator 76. Accordingly, like reference numerals suffixed by the letter "a" have been applied to designate the components of multivibrator 32.

The collector of transistor 76 is connected through an inverter 88 to one input of gate 51, and the collector of transistor **76*a* is connected through another inverter 90 to the other input of gate 51. It will be noted that the non-inverted output of gate 50 is applied to the input of multivibrator 32, while the inverted output of gate 50 is applied to the input of multivibrator 30. Thus, as seen from the output of gate 70, multivibrator 30 will be triggered on the leading or rising edge of each pulse, while multivibrator 32 will be triggered on the falling or trailing edge of each pulse. Both transistor 76 and 76*a*** are biased on.

For the circuit shown in FIG. 2, the base of transistor 76 will be pulled low on the rising edge of each pulse that is supplied at the output of gate 50. As a result, transistor 76 will be turned off for the duration of the RC time constant provided by capacitor 74 and resistor 84. By pulling the base of transistor 76 low, the voltage on the collector of transistor 76 immediately tends to go high, but does not since the parallel connection of resistor 78 and capacitor 80 provides a predetermined time delay before the voltage at the collector of transistor 76 reaches a threshold that causes the output of inverter 88 to change states.

Multivibrator 32 functions in the same manner as multivibrator 30, except that multivibrator 32 will be triggered on the falling edge of each pulse that is supplied at the output of gate 51. Thus, multivibrator 30 will supply a delayed pulse for every leading edge in the pulse train supplied by gate 50, and multivibrator 32 will supply a delayed pulse for every trailing in the pulse train supplied by gate 50. Gate 51 has the effect of summing the pulses supplied by both multivibrators 30 and 32 so that gate 51 will supply a pulse for each and every leading and trailing edge in the pulse train supplied by gate 50. The component values are selected to provide an overall delay of approximately 1 micro second between the input of gate 70 and the output of each of the multivibrators 30 and 32. This delay is substantially equal to the lengths of the pulses supplied at the count-down and count-up output pins.

As shown in FIG. 2, the inputs of gate 40 are connected to the outputs of inverters 60 and 61, the inputs of gate 41 are connected to pin A and to the output of inverter 61, the inputs of gate 42 are connected to pins A and B, and the inputs of gate 43 are connected to the output of inverter 60 and to pin B. The logic at the output of gates 40–43 and other circuit components is illustrated in FIG. 2.

The outputs of gates 40–43 are connected to the data input pins of latches 34–37. The output of gate 51 is connected to the latch pins of latches 34–37. Latches 34–37 may be of the SN 7475 type. When a pulse is supplied by gate 51 to the latch pins of latches 34–37, the data bit or logic state at the D pins of each latch will be transferred to and stored or memorized at the Q output pin of each latch. The data bit or signal state originally at the Q output pin of each latch will be removed when the new data bit is transferred from the D or data input pin to the Q output pin of the latch.

The inputs of gate 52 are respectively connected to the Q output pin of latch 34 and to the output of gate 43, the inputs of gate 53 are respectively connected to the Q output pin of latch 34 and to the output of gate 41, the inputs of gate 54 are respectively connected to the Q output pin of latch 35 and to the output of gate 40, the inputs of gate 55 are respectively connected to the Q output pin of latch 35 and to the output of gate 42, the inputs of gate 56 are respectively connected to the Q output pin of latch 36 and to the output of gate 43, the inputs of gate 58 are respectively connected to the Q output pin of latch 37 and to the output of gate 42, and the inputs of gate 59 are respectively connected to the Q output pin of latch 37 and to the output of gate 40. The four inputs to gate 44 are connected to the outputs of gates 52, 54, 56 and 58, and the four inputs to gate 45 are connected to the outputs of gates 53, 55, 57 and 59. With these circuit connections the count-up pulse train will be provided at the output of gate 45 when the clockwise or right-hand phasing of the quadrature pulse train is applied to pins A and B, and the count-down pulse train will be provided at the output of gate 44 when the counterclockwise phasing or left-hand of the quadrature pulse train is supplied to pins A and B.

From FIG. 4 it will be appreciated that there are only four possible AND'ed conditions of the two serial pulse trains (indicated at A and B) making up the quadrature pulse train. In FIG. 4, the quadrature pulse source is shown as a disc type generator having a driven disc 80 which is formed with an aperture 82 that is large enough to permit simultaneous passage of two light beams from lamps 84 and 86. The photocells activated by these light beams are not shown. The bank of gates 52–59 has the effect of separately comparing each of these four AND'ed conditions (namely AB, $\bar{A}B$, $A\bar{B}$ and $A\bar{B}$) with each of the next succeeding AND'ed conditions in each direction of travel or advance of the movable element of the quadrature pulse generator. AND gates 40–43 are utilized to produce the four possible combinations of logic states of the two serial pulse trains making up the quadrature pulse train. Thus, gates 40–43 respectively provide the four AND'ed conditions of $\bar{A}\bar{B}$, $A\bar{B}$, AB, and $\bar{A}B$.

Latches 34–37 are utilized to store the four possible AND'ed conditions each time a change occurs in the logic state of each of the two serial pulse trains making up the quadrature pulse train. The stored information is then presented to the bank of NAND gates 52–59 for comparison with the four possible AND'ed conditions that occur in the next change in logic state in either of the two serial pulse trains making up the quadrature pulse train. Thus each of the new states of the four AND'ed conditions will separately be compared with each of the two stored conditions that respectively represent the next succeeding AND'ed condition in clockwise direction of travel and the next succeeding AND'ed condition in the counterclockwise direction of travel.

The pulses supplied at the output of gate 51 have a repetition rate dependent upon that of the quadrature pulse train and these pulses are supplied as clock or latch pulses to the latch pins of latches 34–37. Thus, latches 34–47 will be activated for each occurrence of a pulse edge (either rising or falling) in the quadrature pulse train to transfer the data bits at their input pins to their output pins and to store the transferred data bits at their output pins.

Figure 4A:
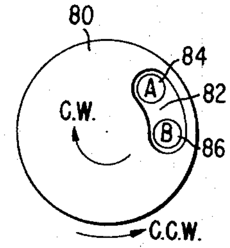
FIGS. 4A, 4B, 4C and 4D illustrate successive positions of a diagrammatic quadrature pulse generator.
Figure 4B:
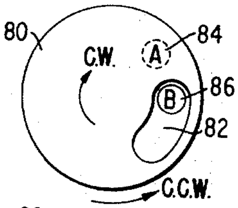
Figure 4C:
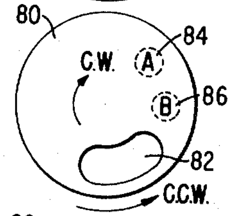

Consider now the example in which disc 80 is at the position shown in FIG. 4C and is moving in a clockwise direction. For the position shown in FIG. C the logic state of pulse train A is low or a logical 0, and the logic state of pulse train B is also low or a logical 0. The outputs of gates 40–43 will therefore be a logical 1, a logical 0, a logical 0, and a logical 0 respectively. These signals are applied to the data input pins of latches 34–37, and when the next latch pulse is supplied by gate 51 they will be transferred to and stored at the Q output pins of the latches. At this stage, therefore, the logic states at the Q output pins will be a logical 1, a logical 0, a logical 0, and a logical 0 respectively. The stored information at latch 34 will be applied to gates 52 and 53, the stored information at latch 35 will be applied to gates 54 and 55, the stored information at latch 36 will be applied to gates 56 and 57, and the stored information at latch 37 will be applied to gates 58 and 59. As will become apparent shortly, the application of the latched information to gates 52–59 causes the logic state at the output of one or the other of the gates 44 and 45 to go high, depending upon which gate output was low when the latched information was applied.

Figure 4D:
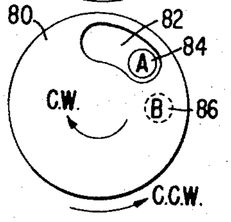

As disc 80 moves in a clockwise direction the change occurring in the logic state of the quadrature pulse train occurs at the position shown in FIG. 4D. Now the outputs of AND gates 40–43 will respectively become a logical 0, a logical 1, a logical 0, and a logical 0. This new information is applied to the data input pins of latches 34–37 and the bank of gates 52–59 before the next latch pulse is supplied by gate 51. As a result, the outputs of gates 52 and 54–59 will remain high, but the output of gate 53 will go low, signifying that the quadrature pulse generator has advanced to its next succeeding position in a clockwise or "count-up" direction. The output of gate 45 will consequently go low to form the leading edge of the count-up pulse, while the output of gate 44 remains high.

After the short delay provided by OR gate 70 and multivibrators 30 and 32, gate 51 supplies the next latching pulse to latches 34–37, and the new information currently at the data input pins of the latches will be transferred to and stored at the Q output pins. Thus the logic state of the stored data bits that are now applied to NAND gates 52–59 will be the same as that supplied by gates 40–43. The output of gate 53 therefore goes high, causing the output of gate 45 to go high thus forming the trailing edge of the negative going pulse at the output of gate 45. Therefore, the combination of gates 40–43, latches 34–37 and gates 52–59 determine the direction in which the pulse generator is traveling, and it is apparent from the foregoing that if disc 80 were rotating in a counterclockwise direction, a serial train of negative going pulses will be supplied at the output of gate 44. Thus a change in state of the quadrature pulse train at either of the input pins A or B will result in a negative going pulse at one or the other of the outputs of gates 44 and 45, but is clear that pulses cannot be supplied at the outputs of gates 44 and 45 at the same time.

It also will be appreciated that the leading edge of each pulse supplied at the output of either gate 44 and 45 will be formed by the effective comparison of current information with stored, preceding information at the inputs to gates 52–59. The trailing edge of the pulse will be formed when the current information is stored and applied to gates 52–59 before two of the outputs of gates 40–43 change to reflect new information that succeeds the above-mentioned current information. At this time, the stored information becomes the old or preceding information that is utilized with the information now at the outputs of gates 40–43.

The delay provided in the circuit by OR gate 70 and multivibrators 30 and 32 is important to provide sufficient time for new information to reach latches 34–37 and gates 52–59 and for the comparison to take place to form the leading edge of either the count-up or count-down pulse before the latch signal is applied. More particularly, any change in state in either of the pulse trains A and B will cause a delayed latch pulse to be produced at the output of gate 51 to memorize the four AND'ed conditions (AB, $\bar{A}$B, $\overline{AB}$, and A$\bar{B}$) corresponding to that chance in quadrature train state which caused the production of the latch pulse.

The total number of count-up and count-down pulses supplied by gates 45 and 44 will equal the total number of changes in state of pulse trains A and B. For the embodiment shown in FIG. 1, the number of pulses in the count-up pulse train will be a function of the magnitude of displacement of platform 14 in one direction, while the number of pulses in the count-down pulse train will be a function of the magnitude of displacement of platform 14 in the opposite direction.

What is claimed and desired to be secured by Letters Patent is:

1. A converter for converting a quadrature pulse train into first and second serial pulse trains which respectively correspond to opposite directions of travel of a generator supplying said quadrature pulse train, said converter comprising a first circuit responsive to said quadrature pulse train for producing a third serial pulse train in which the number of pulses correspond to the total number of pulse edges in said quadrature pulse train, and a second circuit responsive to said third pulse train and each serial pulse train component that is present in said quadrature pulse train for (a) forming the pulses of said first and second pulse trains, (b) applying the formed pulses to one output terminal when said generator is traveling in one direction to make up said first pulse train and (c) applying the formed pulses to another output terminal when the generator is traveling in the opposite direction to make up said second pulse train.

2. The converter defined in claim 1 wherein said first circuit comprises an exclusive OR gate having a pair of inputs for respectively receiving the serial trains making up said quadrature pulse train, inverter means connected to the output of said OR gate, a pair of one-shot multivibrators for respectively receiving pulses supplied by the output of said OR gate and by the output of said inverter means, and means connected to the outputs of said multivibrators to provide said third pulse train in which the number of pulses is the sum of pulses supplied by said multivibrator.

3. The converter defined in claim 2 wherein each of said multivibrators comprise circuit means for producing a delay in the rise time of each multivibrator produced pulse.

4. The converter defined in claim 1 wherein said first circuit includes a time delay network, the delay being substantially equal to the lengths of the pulses in said first and second trains.

5. The converter defined in claim 1 wherein said second circuit comprises a series of four storage devices for memorizing logic states applied to their inputs in response to a memory command pulse, and first means for receiving said quadrature pulse train and for continuously supplying the following logic states respectively to the inputs of said storage devices: $\overline{AB}$, $A\overline{B}$, AB, and $\overline{A}B$, wherein A and $\overline{A}$ are the logic states of one serial pulse train component making up said quadrature train and B and $\overline{B}$ are the corresponding logic states of the other serial pulse train component making up said quadrature train, said first circuit being connected to said storage devices for supplying the pulses of said third train to said storage devices for recurrently commanding said storage devices to memorize the logic states supplied by said first means, and said second circuit further comprising second means connected to receive the memorized logic states at said storage devices and the logic states supplied by said first means, said second means being connected to said output terminals, said second means determining the direction of travel of said generator and cooperating with said storage devices and said first means to form the pulses of said first and second trains.

6. A converter for converting a quadrature pulse train into a serial pulse train comprising an exclusive OR gate having its inputs connected to respectively receive the two pulse trains making up said quadrature pulse trains, inverter means connected to the output of said OR gate, a pair of one-shot multivibrators respectively connected to the output of said OR gate and to the output of said inverter means to respectively receive the pulses supplied by said OR gate and the inversion of the pulses supplied by said OR gate, and means connected to the outputs of said multivibrators to provide said serial pulse train in which the number of pulses are equal to the sum of the pulses supplied by said multivibrators.

7. A converter for converting a quadrature pulse train into first and second serial pulse trains which respectively correspond to opposite directions of travel of a generator supplying said quadrature pulse train, said converter comprising a pair of input terminals for respectively receiving the two serial pulse train components that make up said quadrature pulse train, first and second output terminals, and a circuit connected to said input terminals and to said first and second output terminals and responsive to each change of state in each of the serial pulse train components that is present in said quadrature pulse train for (a) forming a pulse for each change of state occurring in each of the serial pulse train components that is present in said quadrature pulse train, (b) applying the formed pulses to said first output terminal when said generator is traveling in one direction to make up said first pulse train, and (c) applying the formed pulses to said second output terminal when said generator is traveling in the opposite direction to make up said second pulse train.

8. A converter for converting a quadrature pulse train into first and second serial pulse trains which respectively correspond to opposite directions of travel of a generator supplying said quadrature pulse train, said converter comprising a first circuit receiving each serial pulse train component in said quadrature pulse train and responsive to said quadrature pulse train for producing a third serial pulse train in which the number of pulses correspond to the total number of pulse edges in said quadrature pulse train, and a second circuit receiving said third pulse train and each serial pulse train component that is present in said quadrature pulse train, said second circuit being responsive to said third pulse train and said quadrature pulse train for (a) forming an output pulse for each change of state occurring in each of the two serial pulse train components making up said quadrature pulse train, (b) applying the formed output pulses to one output terminal when said generator is traveling in one direction to make up said first pulse train and (c) applying the formed output pulses to another output terminal when the generator is traveling in the opposite direction to make up said second pulse train.

9. A converter for converting a quadrature pulse train into first and second serial pulse trains which respectively correspond to opposite directions of travel of a generator supplying said quadrature pulse train, said converter comprising a first circuit responsive to said quadrature pulse train for producing a third serial pulse train in which the number of pulses correspond to the total number of pulse edges in said quadrature pulse train, and a second circuit means responsive to said third pulse train and said quadrature pulse train for (a) forming an output pulse for each change of state in said quadrature pulse train, (b) applying the formed output pulses to one output terminal when said generator is traveling in one direction to make up said first pulse train and (c) applying the formed output pulses to another output terminal when the generator is traveling in the opposite direction to make up said second pulse train irrespective to those oscillations of said generator that produce changes of state in only one of the two pulse train components of said quadrature pulse train.

10. A converter for converting a quadrature pulse train into first and second serial pulse trains which respectively correspond to opposite directions of travel of a generator supplying said quadrature pulse train, the logic states of the two pulse train components making up said quadrature pulse train having any one of four different And'ed combinations at a given time, said converter comprising a first circuit responsive to said quadrature pulse train for producing a third serial pulse train in which the number of pulses correspond to the total number of pulse edges in said quadrature pulse train, a second circuit responsive to said quadrature pulse train for developing signals that are indicative of said four And'ed combinations for each change of state in either of the pulse train components of said quadrature pulse train, and a third circuit responsive to said third pulse train and to the signals developed by said second circuit for (a) forming an output pulse for each change of state in each pulse train component of said quadrature pulse train, (b) applying the formed output pulses to one output terminal when said generator is traveling in one direction to make up said first pulse train and (c) applying the formed output pulses to another output terminal when the generator is traveling in the opposite direction to make up said second pulse train.

11. A circuit for converting a quadrature pulse train into first and second serial pulse trains which respectively correspond to opposite directions of travel of a generator supplying said quadrature pulse train, there being four different possible combinations of logic states of the two serial pulse train components making up said quadrature pulse at any given time, said circuit comprising first logic gate means for logically multiplying the two logic states in each of said four combinations of logic states to provide a set of four logic signals that respectively indicate the products resulting from the four multiplications for each change of state occurring in said quadrature pulse train, means for temporarily and sequentially storing each set of said logic signals to retain each set until after the occurrance the set of said signals associated with the next change of state in said quadrature pulse train, and second logic gate means responsive to each set of said signals and to the stored set of said signals for (a) forming a pulse for each change of state occurring in said quadrature pulse train, (b) applying the formed pulses to one output terminal when said generator is traveling in one direction to make up said first pulse train, and (c) applying the formed pulses to another output terminal when the generator is traveling in the opposite direction to make up said second pulse train.

12. A circuit for converting a quadrature pulse train into first and second serial pulse trains which respectively correspond to opposite directions of travel of a generator supplying said quadrature pulse train, there being four different possible combinations of logic states of the two serial pulse train components making up said quadrature pulse at any given time, said circuit comprising logic gate means for logically multiplying the two logic states in each of said four combinations of logic states to provide a set of four logic signals that respectively indicate the products resulting from the four multiplications for each change of state occurring in said quadrature pulse train, and means for effecting a comparison between each set of said signals and the set of said signals associated with the next succeeding change of state in said quadrature pulse train for (a) applying a pulse to one output terminal for each change of state in said quadrature pulse train when said generator is traveling in one direction to make up said first pulse train and (b) applying a pulse to another output terminal for each change of state in said quadrature pulse train when the generator is traveling in the opposite direction to make up said second pulse train.

* * * * *